United States Patent
DeKalb

(10) Patent No.: US 8,413,368 B2
(45) Date of Patent: Apr. 9, 2013

(54) ADVANCED-POWERED SLIDING OR GUILLOTINE DOOR TRAP SYSTEM FOR CAGE OR CORRAL-TYPE ANIMAL TRAPS

(76) Inventor: Kirk Alan DeKalb, Doerun, GA (US)

( * ) Notice: Subject to any disclaimer, the term of this patent is extended or adjusted under 35 U.S.C. 154(b) by 0 days.

(21) Appl. No.: 13/136,119

(22) Filed: Jul. 25, 2011

(65) Prior Publication Data

US 2013/0025182 A1    Jan. 31, 2013

(51) Int. Cl.
*A01M 23/00*    (2006.01)
(52) U.S. Cl. .................................... 43/61; 43/62; 43/67
(58) Field of Classification Search ................ 43/61, 62, 43/67, 60
See application file for complete search history.

(56) References Cited

U.S. PATENT DOCUMENTS

| | | | | |
|---|---|---|---|---|
| 49,378 A | * | 8/1865 | Churchhill | 43/67 |
| 593,924 A | * | 11/1897 | Crandall | 280/42 |
| 928,649 A | * | 7/1909 | Franks | 43/62 |
| 2,447,147 A | * | 8/1948 | Warner | 43/61 |
| 2,478,286 A | * | 8/1949 | Lanza | 43/62 |
| 4,080,749 A | * | 3/1978 | Gilbaugh | 43/61 |
| 4,159,590 A | * | 7/1979 | Palfalvy | 43/61 |
| 4,766,692 A | * | 8/1988 | Shurden | 43/78 |
| 4,829,701 A | * | 5/1989 | ImBrogno | 43/61 |
| 5,199,210 A | * | 4/1993 | Nastas | 43/61 |
| 6,543,179 B1 | * | 4/2003 | Lee | 43/61 |
| 6,618,982 B2 | * | 9/2003 | Lafforthun | 43/61 |
| 8,061,076 B2 | * | 11/2011 | Kelley | 43/61 |
| 2004/0107630 A1 | * | 6/2004 | Evans et al. | 43/61 |
| 2009/0293340 A1 | * | 12/2009 | Kelley | 43/61 |

* cited by examiner

*Primary Examiner* — Christopher P Ellis

(57) ABSTRACT

A trap door system for sliding trap doors or guillotine-style traps has a door guide assembly in which a door of a trap slides. The system provides a powered door using a door spring arming assembly having compression springs and spring slides situated on door supports. With the door open, the spring slides compress the compression springs and engage a door spring stop to bias the door toward a closed position. The door is spring loaded so that when a support mechanism with trigger is operated to release a catch assembly, the door rapidly closes. The catch assembly includes a spring to bias the catch arm to position for locking the door once closed. The support mechanism may be situated to operate multiple doors using the system.

8 Claims, 5 Drawing Sheets

POWERED GUILLOTINE-STYLE
ENTRY DOOR CAGE TRAP
WITH INTERMEDIATE LINK
LEFT-HAND ISOMETRIC VIEW

POWERED GUILLOTINE-STYLE ENTRY DOOR CAGE TRAP WITH INTERMEDIATE LINK
LEFT-HAND ISOMETRIC VIEW

POWERED GUILLOTINE-STYLE
ENTRY DOOR CAGE TRAP
WITH INTERMEDIATE LINK
RIGHT-HAND ISOMETRIC VIEW

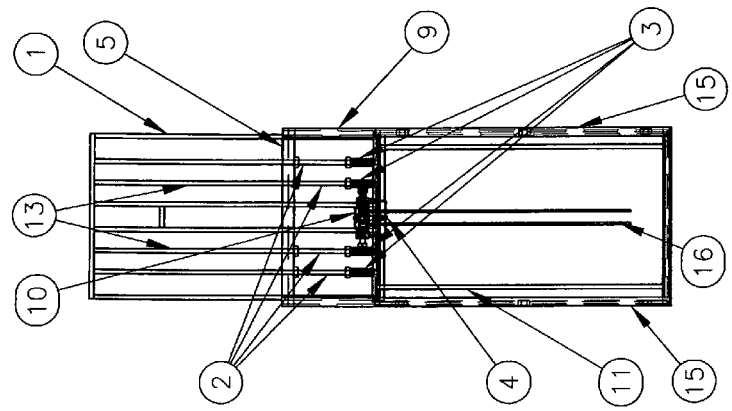
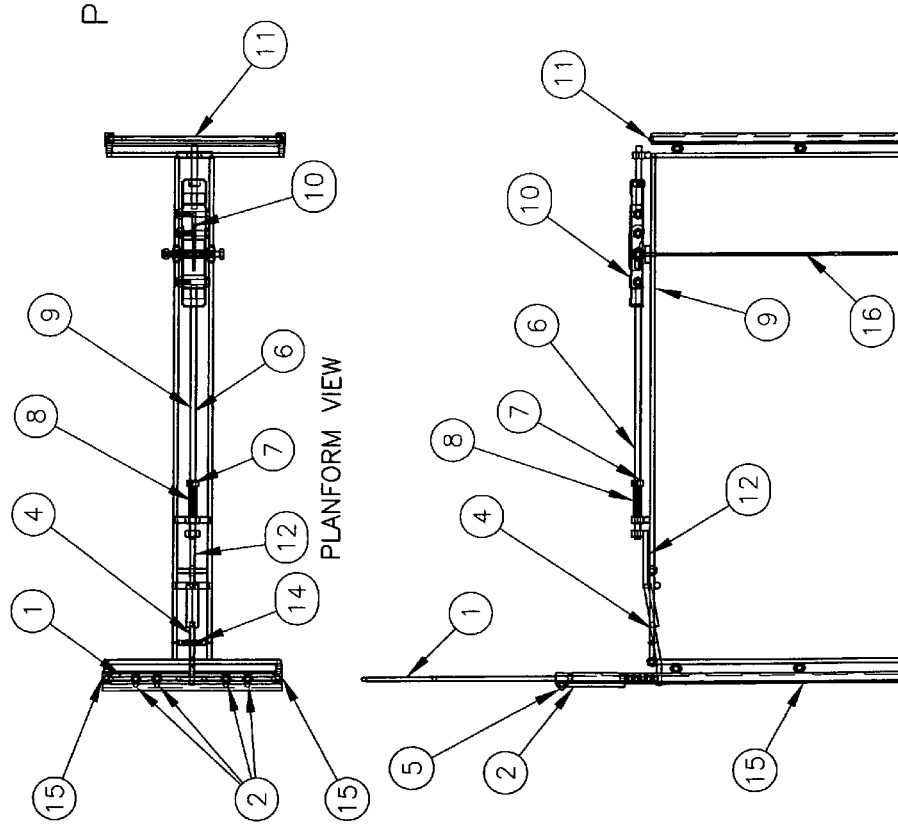
FIGURE 3
POWERED GUILLOTINE-STYLE WITH INTERMEDIATE LINK ENTRY DOOR CAGE TRAP
THREE-VIEW

ITEM 1 DOOR ASSY DETAIL

ADVANCED-POWERED SLIDING OR GUILLOTINE DOOR TRAP SYSTEM FOR CAGE OR CORRAL-TYPE ANIMAL TRAPS

BACKGROUND OF THE INVENTION

1. Field of the Invention

The present invention relates to powered cage trap systems, and, particularly, to an improved spring powered guillotine door system for cage traps.

2. Description of the Related Art

As the years have progressed, the use of powered cage trap systems has evolved slowly. Some traps now use power trigger systems, and progress has sped up and set new expectations for powered door systems to be used for cage traps and corral traps. These expectations have yet to be met with respect to a powered guillotine door system, as such innovation has been slow to evolve until the present invention because of the know abilities and limitations of triggers and trigger assemblies. However, a need exists for a more advanced powered guillotine door system that will increase the ability of a guillotine door cage trap to be used on an incline or to be set at angles not allowed with a standard gravity door. A further need exists for a powered guillotine door system that can be used in water to catch rapidly moving animals moving down a run or channel.

Standard gravity door cage traps have certain disadvantages that the current invention overcomes. For instance, when using a gravity door cage trap, if the door has an obstruction such as a small stick or snow under the door, the door may not close completely, thus not locking the door. Another disadvantage is that a standard gravity door catch mechanism may allow the door to open if the trap is turned over.

BRIEF SUMMARY OF THE INVENTION

A trap door system is provided in the present invention that has an advanced powered guillotine or sliding door system. The features of the invention enhance the allowable uses of a guillotine door or sliding door type animal trap. More than one powered door may be incorporated into the trap door system. In particular, a guillotine style cage trap may include a powered sliding door on opposing ends and use a double support mechanism in connection with the trigger for the trap.

Each trap door system includes a frame with at least one sliding entry door. The entry door is situated within an entry door guide assembly in which the door slides and locks. A release assembly interacts with a catch assembly on the trap to release the door. The door is powered by a door spring arming assembly that includes compression springs arranged on spring slide bars. The compressing springs are engaged by compressing the springs using a door spring stop. The catch assembly holds the compression springs under compression until the release assembly operates to release the catch arm. The release assembly operates through a release rod that is biased by a trigger compression spring to move and release the catch arm. The release assembly maintains the release rod in a position with the catch assembly ready to be trigger through a support mechanism having a trigger. The trigger on a support mechanism is moved to release the catch arm via the release rod.

The compression springs rapidly force the door to close when the catch arm is released. After the door closes, an extension spring, also known as a catch assembly stop spring, biases the catch assembly catch arm and causes the catch arm to move back into place and return to its position. The extension spring is situated across the arm of the catch assembly. The catch arm locks the door in the closed position.

The present invention allows more varied use of cage traps on inclines, uneven ground, in bad weather conditions, and in water or under water. The powered sliding door for guillotine or sliding door traps may operate at various positions and angles, and enhances the capability of the trapping process through speed and force. Because of such speed and force, the powered sliding door allows the trap to be used in water to catch rapidly moving animals moving down a run or a channel, wherein the door slices through water rapidly and operates more effectively than a common swing-style cage door or a gravity powered slide door.

A more open side door trap may be provided with a powered sliding door to improve trapping of animals and adaptation of the trap to improved cage designs or corral type traps.

The embodiments of the invention include a tip up cam action for the catch assembly of a powered door trap whereby the catch assembly locks the door of the trap after the door is released and closed. Further, the catch assembly may be provided a catch arm with an adjustable length and an adjustable extension spring in tension biasing the arm to close the catch assembly, whereby the catch assembly can be adjusted according to the power needs of the door by changing the length of the arm and the tension of the extension spring.

BRIEF DESCRIPTION OF THE SEVERAL VIEWS OF THE DRAWINGS

FIG. 3 is a combination of a top plan view, a front elevation view and a side view of the trap door system.

DETAILED DESCRIPTION OF THE INVENTION

Figure 1:
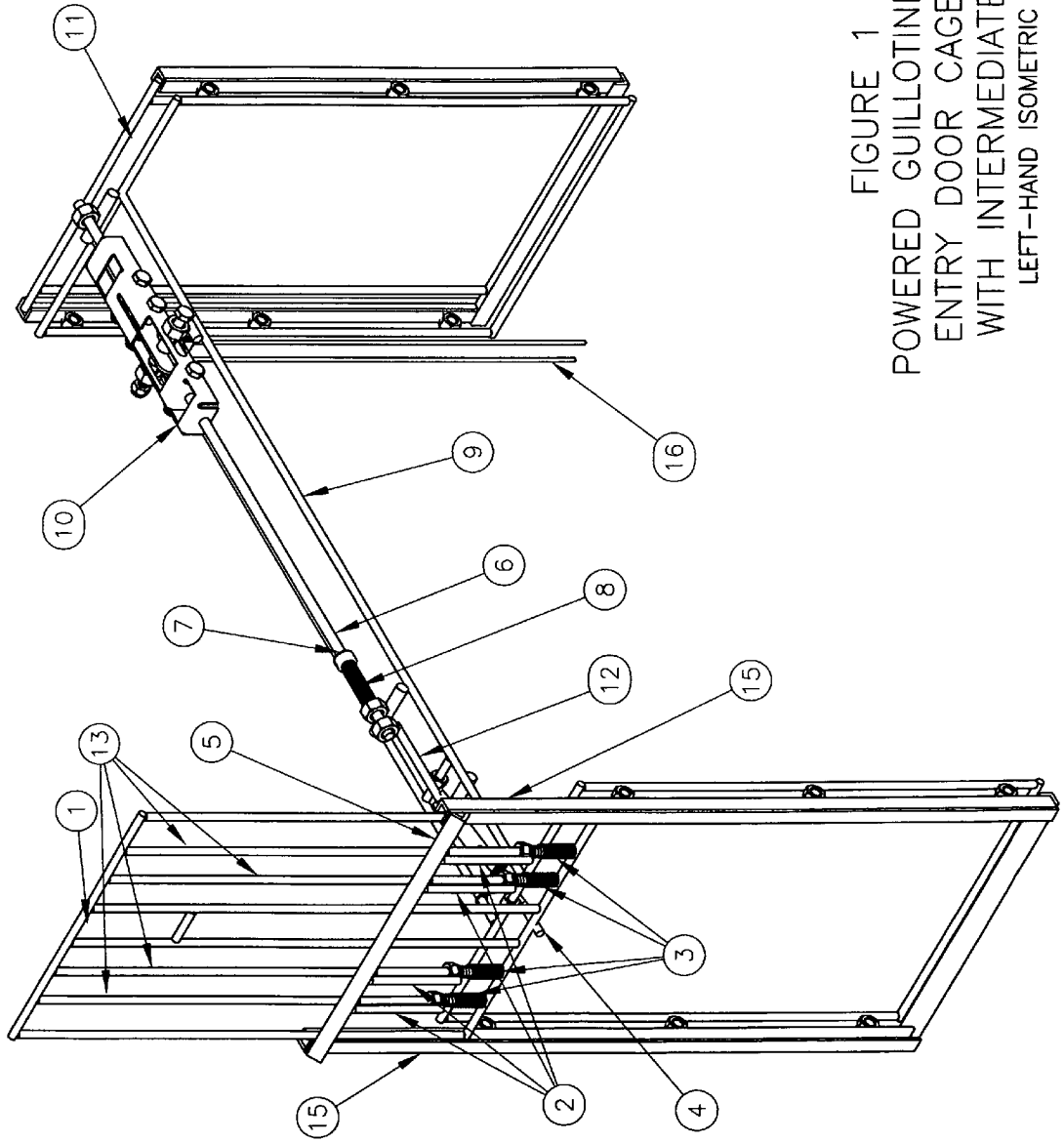
FIG. 1 is a left-hand isometric view of a powered guillotine-style entry door cage trap with a trap door system in accordance with the invention having an intermediate link and release assembly.
Figure 2:
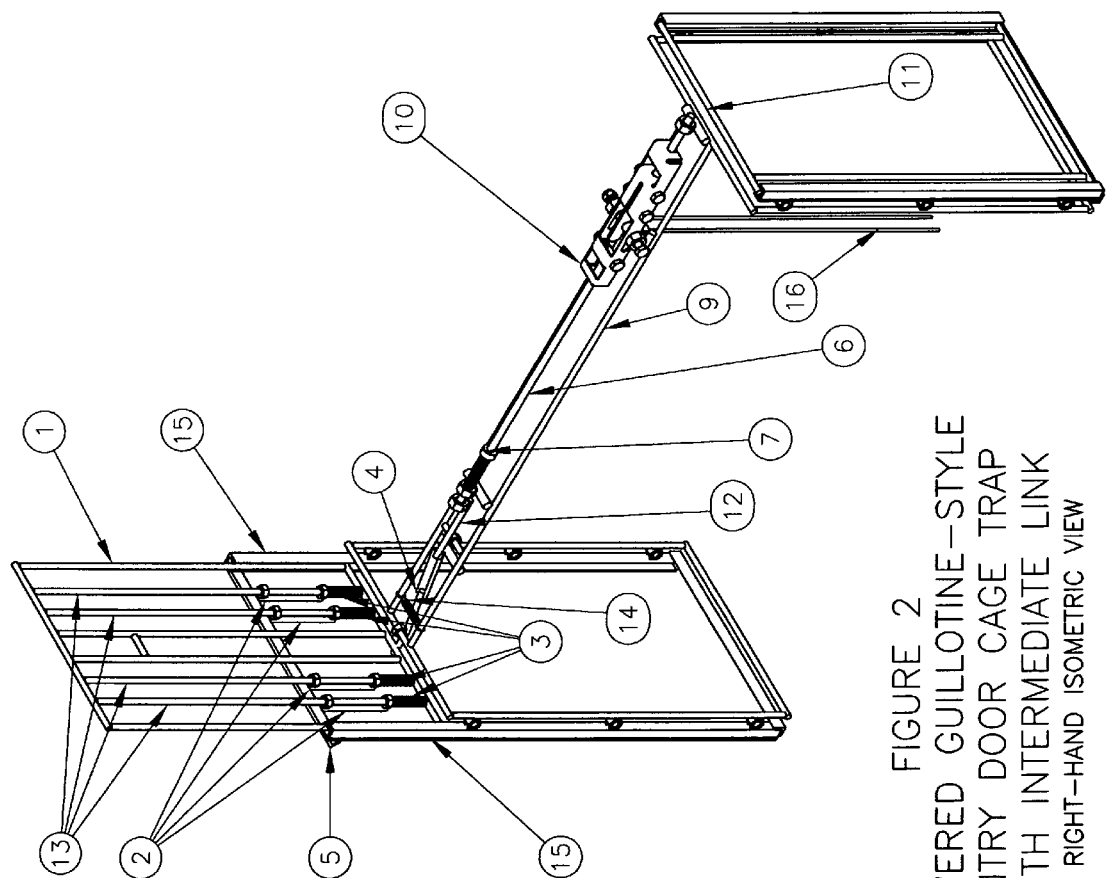
FIG. 2 is a right-hand isometric view of a powered guillotine-style entry door cage trap with a trap door system according to the invention having an intermediate link and release assembly.
Figure 4:
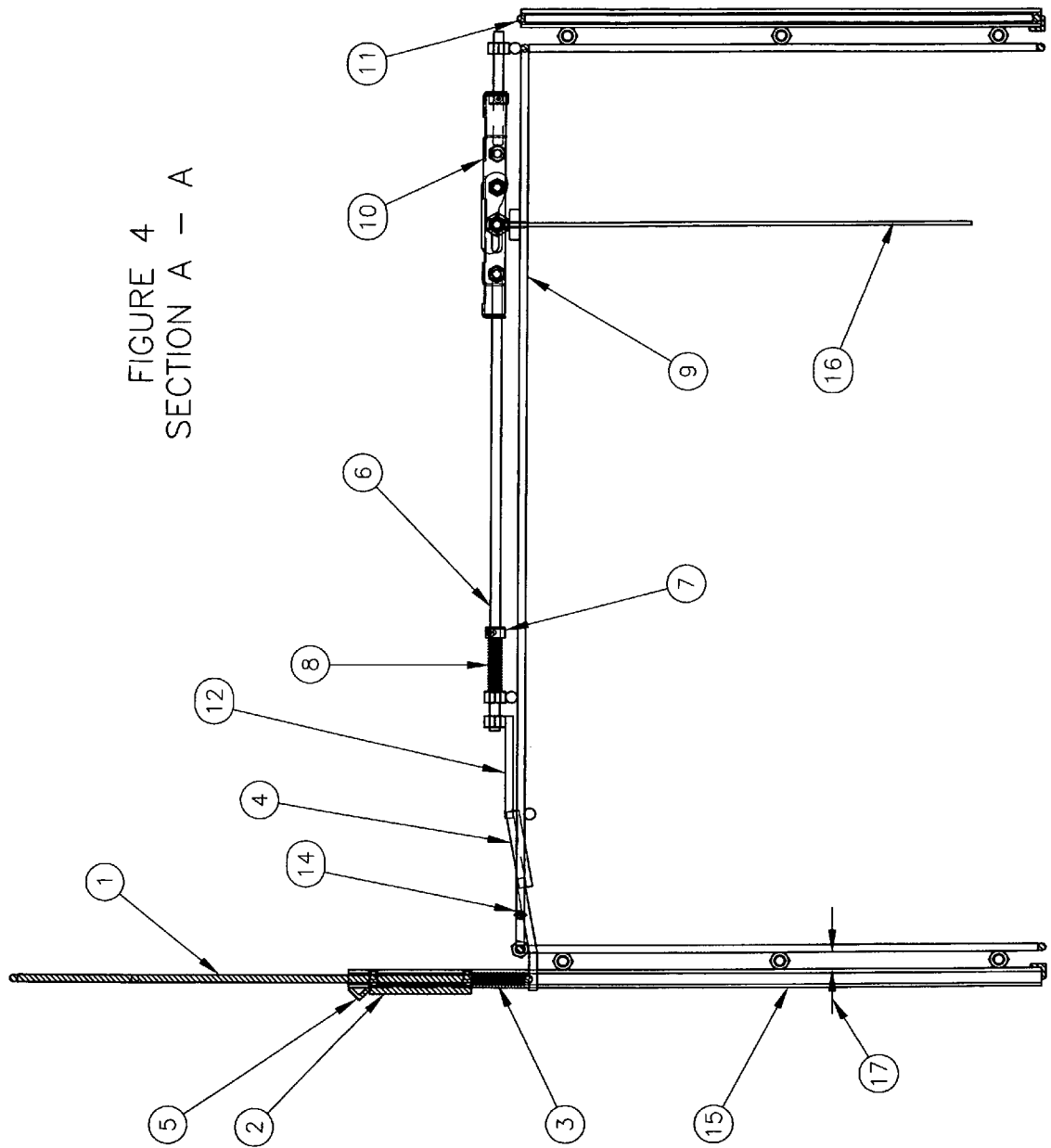
FIG. 4 is a cross-sectional side plan view of the trap door system.

FIG. 1, FIG. 2, FIG. 3 and FIG. 4 illustrate a trap door system in accordance with an embodiment of the invention. The figures show a front entry advanced powered guillotine door cage-type trap frame 9. The guillotine door or sliding door cage-type trap is generally rectangular in shape like that of a box. However, those in the art should appreciate that guillotine door or sliding door cage-type traps may have any shape that has an interior volume large enough to house an animal to be trapped.

The trap door system is used on a trap having a cover or housing (not shown) fashioned of mesh, webbing, metal, PVC, or other materials and designs. The trap includes a trap frame 9 that can be made of multiple structural elements. The trap includes an entry door 1, which in the present invention is enhanced by a powered trap door system further described below.

The trap door system includes an intermediate release assembly or release assembly. The release assembly is triggered to release a catch assembly 4 that operates the powered door 1. The release assembly includes a support mechanism 10 for supporting a trigger attached to the support mechanism and a release rod 6 attached to the support mechanism for interaction with the catch assembly 4. The release rod 6 is spring loaded using a combination of a trigger compression spring 8 that bears against a shaft collar 7. The release rod 6 interacts directly with the catch assembly 4 or interacts with an intermediate link assembly 12 between the release rod 6 and the catch assembly 4 to manage setting the trap while pressure is placed on the catch assembly 4 by the powered door 1.

The catch assembly 4 includes a catch arm that pivots to engage a portion of the door 1 when the trap is set. The catch assembly 4 locks the door 1 in closed position after the door is released. The depiction in the FIGS. 1-4 show the door 1 in the open position engaging the catch assembly 4 and being powered by the door spring arming assembly 2. The intermediate link assembly 12 on the end of the release rod 6 holds the catch arm 4 against the door 1 when the door is open and the trap is set. The compression springs 3 rapidly force the door 1 to close when the catch arm is released. After the door 1 closes, an extension spring 14, also known as a catch assembly stop spring, biases the catch assembly 4 catch arm and causes the catch arm to move back into place and return to its position. The extension spring 14 is situated across the arm of the catch assembly 4 and causing a cam-release action of the catch assembly when moving back into position. The catch assembly 4 locks the door 1 in the closed position after door release.

The door spring arming assembly 2 includes compressions springs 3 and a spring slide 13 on the door 1. The compression springs can be varied in length and compression strength according to the design of the trap and the power desired. The spring slides 13 can be varied in length and design to adjust to the needs of the physics of the door 1.

The compression springs 3 and spring slides bars or spring slides 13 slide along door guide bars or supports on the door 1 to engage a door spring stop 5. Once the catch is set and the spring slide bars 13 compress the compression springs 3 and engage the door spring stop to bias the door 1, the door is ready to be forced closed when release assembly is triggered. The door 1 slides within an entry door guide assembly 15 that may comprise a pair of opposing rails in which the door is retained and slides down in when the door is released. The door spring stop 5 is situated at the top of the guide assembly 15. A clearance gap 17 is provided between the guide assembly 15 and the trap frame 9 that allows the spring slide bars or spring slides 13 to be set without the trap frame 9 interfering with movement of the spring slides 13.

The depiction in the Figures is a single sliding door 1. However, multiple doors could be used or applied and not affect the operation of the advanced power door system. The support mechanism assembly 10 enables use of multiple powered doors using the present trap door system. Additionally, more than one type of door might be used in a trap that uses the features of the invention. For example, a bait-type door 11 could be placed opposite of an existing door, as well as a powered door 1 could be mounted on either side of the trap. The doors may fire and lock all at the same time through successive movements of more than one release rod 6 that operate several intermediate link assemblies 12 and catch assemblies 4.

Referring further to FIGS. 1-5, the relationship of all of the firing components of the powered trap door system is shown in an exemplary guillotine-style trap door system. With respect to the method for operating the trap, the trap is set by the operator lifting the intermediate link assembly 12 with the left hand and then pushing the support mechanism assembly 10 forward, thereby setting the trigger mechanism or trigger 16. The release rod 6 is placed in a slot on the intermediate link assembly 12. Then, the operator lifts the catch assembly 4, which pivots, with the right hand, while at the same time lifting the door 1 above the catch arm of the catch assembly 4 with the left hand and then lowering the catch assembly holding the door in place. The operator places the catch arm of the catch assembly 4 under the end of the intermediate link assembly 12. The catch assembly 4 holds the door 1 in place until the trigger mechanism or trigger 16 is moved causing the release assembly to operate and release the catch and, thus, the door. The catch assembly 4 has a catch arm that may be varied in length so as to adjust for door pressure caused by the compressions springs 3 of the door spring arming assembly 2.

The door 1 is armed by pulling down on the door spring arming assembly 2. The spring slide bar 13 compresses the compression spring 3, and the spring slide bar 13 is turned to lock the spring arming assembly in place on the spring door stop 5. When an animal pushes, grabs, pulls, bumps, or moves the trigger 16, the sequence of events reverts from last to first releasing door 1 and locking the door in front of the trap with the catch assembly 4. If a bait door is provided, the bait door 11 will lock in back of the trap with a release rod 6. Because of the length of the catch assembly 4 and the length of intermediate link assembly 12 in relationship to the components of the support mechanism assembly 10, powering the door 1 has very little effect on the sensitivity of the trigger mechanism 16.

Figure 5:
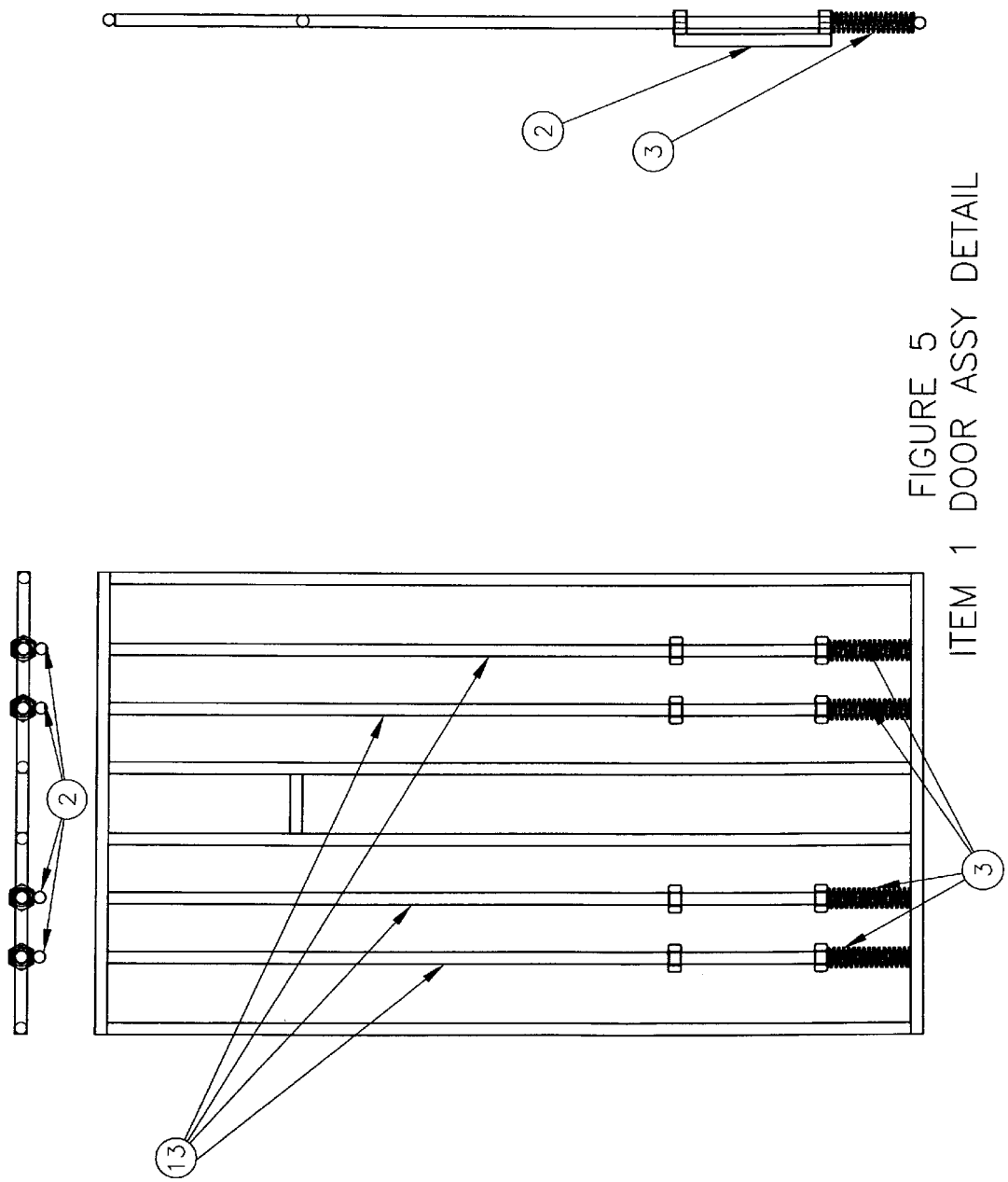
FIG. 5 is a detailed view of the elements of the invention providing the powered entry door assembly.

Embodiments of the powered door system in the form of a guillotine door system or sliding door system can be seen in FIG. 5. The door spring arming assembly 2 and its components support the power sliding door actions so as to maximize the door efficiency. The combination of the entry door guide assembly 15 and the door spring arming assembly 2 places the door 1 in proper alignment to its components and holds them at correct angles and relationships so as to allow maximum use for their functions. The door length in relationship to the compression springs 3 on the doors is long enough to allow for fully powered door travel when the trap door 1 is released. The arrangement of features in the present invention allow for new advanced methods of trap design and modification.

In another embodiment the trap door system includes a slotted end double support mechanism similar to support mechanism 10. The release assembly in combination with the double support mechanism includes both first and second release rods 6 on the front and rear of the support mechanism 10. The rear release rod then serves as a lock and a release for a second door on the respective end of the trap. The second door is situated in a entry door guide assembly as discussed above and may include a door spring arming assembly for providing a powered door in accordance with the features of the invention. An additional catch assembly 4 may be provided, or the second release rod may act as the catch mechanism.

The invention claimed is:
1. A trap door system for an animal trap comprising:
a trap frame;
a door;
a door guide assembly attached to the trap frame and holding the door in sliding engagement and having a door spring stop;
a support mechanism including a trigger;
a release assembly connected to the support mechanism and including a release rod for engaging the door; and
a door spring arming assembly including compression springs and spring slides supported by the door and the spring slides move on the door to engage the door spring stop for compression of the springs into a position to bias the door to close.

2. A trap door system as in claim 1 in which said release rod engages the door via a catch assembly and the catch assembly includes a catch arm that pivots.

3. A trap door system as in claim 2 in which the length of the catch arm is determined according to adjustment for door pressure caused by the door spring arming assembly.

4. A trap door system as in claim 2 including an extension spring across the catch arm of the catch assembly, whereby the catch assembly forms a lock for the door when closed and the spring causes the catch arm of the catch assembly to move back into place after the door is released to close.

5. A trap door system as in claim 1 in which said support mechanism is a double support mechanism connected to two release rods of the release assembly with one release rod engaging a first door and the other release rod engaging a second door.

6. A trap door system as in claim 5 in which at least one of said release rods provides a lock and a release for the respective door.

7. A trap door system as in claim 5 in which at least one of said release rods engages the respective door via a catch assembly.

8. A trap door system as in claim 1 in which a gap is provided between the door guide assembly and the trap frame, whereby the compression springs move on spring slide bars of the door without interference by the frame with the compression springs or the spring slides while the spring slides are moved to engage the door spring stop.

* * * * *